US010052836B2

(12) United States Patent
Vogeleer et al.

(10) Patent No.: US 10,052,836 B2
(45) Date of Patent: Aug. 21, 2018

(54) ROTARY TABLET PRESS COMPRISING A TURRET AND A METHOD OF PROVIDING IMPROVED ADJUSTMENT OF PARTS OF THE ROTARY TABLET PRESS

(71) Applicant: GEA Process Engineering nv, Halle (BE)

(72) Inventors: Jan Vogeleer, Bornem (BE); Ivo Van Den Mooter, Willebroek (BE); Freddy Gerard Luc Vandenbroucke, Roux (BE); Joris Vanderputten, Buizingen (BE); Nicolas Robin, Sint-Stevens-Woluwe (BE); Frederik Detobel, Halle (BE)

(73) Assignee: GEA PROCESS ENGINEERING NV (BE)

(*) Notice: Subject to any disclaimer, the term of this patent is extended or adjusted under 35 U.S.C. 154(b) by 143 days.

(21) Appl. No.: 15/120,485

(22) PCT Filed: Feb. 20, 2014

(86) PCT No.: PCT/IB2014/000180
§ 371 (c)(1),
(2) Date: Aug. 19, 2016

(87) PCT Pub. No.: WO2015/124958
PCT Pub. Date: Aug. 27, 2015

(65) Prior Publication Data

US 2018/0178474 A1 Jun. 28, 2018

(51) Int. Cl.
*B29C 43/08* (2006.01)
*B30B 11/08* (2006.01)
(Continued)

(52) U.S. Cl.
CPC .......... *B30B 11/08* (2013.01); *B30B 15/0023* (2013.01); *B30B 15/026* (2013.01); *B30B 15/32* (2013.01)

(58) Field of Classification Search
CPC ...................................................... B29C 43/08
(Continued)

(56) References Cited

U.S. PATENT DOCUMENTS 5,004,413 A 4/1991 Stopforth
6,361,302 B1 3/2002 Hinzpeter et al.
(Continued)

FOREIGN PATENT DOCUMENTS

CN 202685350 U 1/2013
DE 824 541 C 12/1951
(Continued)

*Primary Examiner* — Joseph S Del Sole
*Assistant Examiner* — Thu Khanh T Nguyen
(74) *Attorney, Agent, or Firm* — Condo Roccia Koptiw LLP

(57) ABSTRACT

The rotary tablet press has a housing including a compression section (6) with a turret (10) including a die disc (40), a top punch guide (20), a bottom punch guide (30), and a plurality of punches (25, 35). The turret (10) defines an axial direction (a) and a radial direction (r), the punches being arranged at a predefined radius defining a pitch (p) of the turret. The rotary tablet press comprises a bearing assembly (50) connected to the turret (10) and providing support to at least one auxiliary component of the rotary tablet press and the bearing assembly comprises a bearing (51) and a support means (60) for the at least one auxiliary component, and the bearing (51) is positioned outside the pitch (p) of the turret in the radial direction (r).

20 Claims, 6 Drawing Sheets

(51) Int. Cl.
*B30B 15/32* (2006.01)
*B30B 15/02* (2006.01)
*B30B 15/00* (2006.01)

(58) Field of Classification Search
USPC .......................................................... 425/345
See application file for complete search history.

(56) References Cited

U.S. PATENT DOCUMENTS

| | | | | |
|---|---|---|---|---|
| 6,676,863 | B2 * | 1/2004 | Christiaens ............... | B08B 3/02 425/345 |
| 2008/0029915 | A1 | 2/2008 | Waldron | |
| 2012/0058215 | A1 | 3/2012 | Mies et al. | |

FOREIGN PATENT DOCUMENTS

| | | | |
|---|---|---|---|
| DE | 824 841 | C | 12/1951 |
| EP | 1 050 399 | A2 | 11/2000 |
| EP | 1 423 260 | B1 | 6/2004 |
| EP | 2133195 | A1 | 12/2009 |
| FR | 2 969 032 | A1 | 6/2012 |
| JP | 3007207 | U | 2/1995 |
| JP | 2003-139144 | A | 5/2003 |
| JP | 2002-239798 | A | 8/2008 |
| JP | 2009248141 | A | 10/2009 |
| JP | 2012-525979 | | 10/2012 |
| WO | WO 2003/020499 | A1 | 3/2003 |
| WO | WO 2009/112886 | A1 | 9/2009 |

* cited by examiner

ROTARY TABLET PRESS COMPRISING A TURRET AND A METHOD OF PROVIDING IMPROVED ADJUSTMENT OF PARTS OF THE ROTARY TABLET PRESS

CROSS REFERENCE TO RELATED APPLICATIONS

This application is the National Stage Entry under 35 U.S.C. § 371 of Patent Cooperation Treaty Application No. PCT/IB2014/000180, filed 20 Feb. 2014 the contents of which are hereby incorporated by reference herein.

FIELD OF THE INVENTION

The present invention relates to a rotary tablet press comprising a housing including a compression section, a turret including a die disc, a top punch guide, a bottom punch guide, and a plurality of punches, said turret defining an axial direction and a radial direction, the punches being arranged at a predefined radius defining a pitch of the turret, said turret being positioned in the compression section in a position of use of the rotary tablet press, and a number of auxiliary components. The invention furthermore relates to a method for providing adjustment of at least one auxiliary component of a rotary tablet press.

BACKGROUND OF THE INVENTION

In such a rotary tablet press, the turret is positioned in the compression section in a position of use of the rotary tablet press, i.e. when the tablet press is in working operation. The turret comprises a number of parts or components including a die disc secured between a top punch guide and a bottom punch guide. Alternatively, the die disc is integral with the top and/or bottom punch guide in a one-part or two-parts turret. The turret is driven in rotation by means of a spindle coupled to driving means and the entire turret thus rotates during operation. A powder or granular material is fed into the die bores of the rotary tablet press by means of a feeder connected to the press housing. The rotation entails, i.a., that the punches accommodated in the top and bottom punch guides are reciprocated to compress the material to tablets.

In order to carry out a change-over in the production, e.g. from one material to another or from one tablet size or shape to another, or from one press station to multiple press stations, or change-over from single layer to multilayer (such as bilayer or several layers) production, and/or to and from dry-coated tablet production, the entire turret and auxiliary components are traditionally removed in order to clean the turret or to replace the punches and dies in the turret or to install or remove various components (e.g. switch from single layer to double layer). Subsequently, the turret and auxiliary components are positioned back into the compression section and possibly adjusted.

However this arrangement has a number of drawbacks. First, various auxiliary components need to be removed from press, before turret can be removed, which in turn affects the change-over time. Second, auxiliary components can also only be installed if the turret is positioned back in the press housing.

In order to solve this, solutions have been suggested to remove auxiliary components together with turret. Examples of prior art tablet presses are described in EP 1 050 399 A2, and in WO 03/020499 A1 resulting in EP 1 423 260 B1 to Courtoy and the commercially available tablet press MODUL™ making use of the Exchangeable Compression Module (ECM) concept. However, when the turret is shifted from one press to another, re-adjustment might therefore be needed, again increasing change-over time. Even in the suggested solution, the auxiliary components are however referenced to press housing, in particular the frame thereof, and the position of the components can only be adjusted when the turret is installed inside the press.

Adjustment of components inside press is not easy due to limited accessibility in the press, especially in case of multilayer configuration with several components present in the turret and the housing as such, and also in the case of dry-coated tablets where an intake system is needed to place the cores inside the die bores. This is also the case in prior art apparatus in which the possibility of keeping the compression zone contained and washing the ECM off line is provided, in order to ensure that no cleaning of press housing is needed, hence facilitating fast change-over. However, accessibility and cleanability are not necessarily made more easy, especially when several components are present such as in multilayer production.

However, in all of the above prior art tablet presses, although providing well-functioning solutions, it is a challenge to ensure that all parts of the rotary tablet press are positioned accurately in order to secure proper functioning.

SUMMARY OF THE INVENTION

With this background it is an object of the present invention to provide a rotary tablet press of the kind mentioned in the introduction, by which the accuracy and efficiency of adjustment procedure are increased, as well as improved accessibility and cleanability.

In a first aspect, this and further objects are achieved by a rotary tablet press, which is furthermore characterized in that the rotary tablet press comprises a bearing assembly connected to the turret and providing support to at least one auxiliary component of the rotary tablet press, that the bearing assembly comprises a bearing and a support means for the at least one auxiliary component, and that the bearing is positioned outside the pitch of the turret in the radial direction.

By providing such a bearing assembly, it is possible to obtain a reference point which is relative to the turret rather than to the housing of the press. Thus, auxiliary components have a well-defined position relative to the relevant part of the tablet press, namely the turret. The position of such components may also be calibrated relative to the turret outside the compression section of the housing, which facilitates the procedure even further. The position of the bearing outside the pitch of the turrets ensures simplicity and optimum accuracy. The adjustment and provision of a reference point is relevant to a variety of auxiliary components including but not limited to tablet chute, extraction nozzles, cams, scrapers, core intake device, etc. Other auxiliary components that benefit from easy adjustment and referencing may include a cover and related seals.

The bearing assembly may in principle provide support in either the axial direction or the radial direction only. However, in a preferred embodiment, the bearing assembly provides support in the axial direction and the radial direction of the turret. Providing the reference to the radial position and distance from the die plate and dies, as well as the position in the axial direction, i.e. the vertical position, when the turret is in an upright position, of the auxiliary component relative to the turret and in turn the die table, makes it easy to check and adjust the position of such auxiliary components outside the press housing. Because of the fixed axial and radial position of the bearing assembly relative to the turret, the position of every component relative to the turret is well-defined in both the axial and the radial direction once attached at the desired position on the bearing assembly. Support is hence given both in radial and axial direction. The required accuracy is not necessarily equal for every auxiliary component in every direction. For instance, it is particularly advantageous that the bearing assembly forms a reference for the axial position of the feeder. Support and referencing in the radial position is of particular advantage in certain components such as the scraper and the recuperation finger, as these components are traditionally free floating on top of the die table in the axial direction, as axial movement is made possible by means of a hinge element or by the connection by means of special bolts. Examples of auxiliary components to which support in both the radial and axial position is important are the extraction nozzles, the ejection finger, the core intake system in the case of production of dry-coated tablets, and bottom cams.

The bearing may in principle be any conceivable bearing which is suitable for the purpose, but is in a preferred embodiment a ball bearing, preferably a four point contact ball bearing, which may more preferred be pre-loaded, to ensure high accuracy and high load capacity.

Preferably, an anti-rotation element is provided that prevents the support means from rotating during use. The anti-rotation element may be connected to the housing of the press for ease of mounting.

In one mechanically simple and reliable embodiment, the bearing assembly comprises a bearing, a bearing housing and a support flange, the bearing housing including an inner bearing housing part connected to an outwards facing circumferential of said turret, and an outer bearing housing part connected to the support flange. In a further development of this embodiment, the inner bearing housing part is connected to the lower punch guide at a stepped portion constituting said outwards facing circumferential of the turret.

Alternatively, the bearing assembly comprises a bearing connected to an inwards facing circumferential of said turret, which reduces the circumferential extent of the bearing assembly. In a further development of this embodiment, the bearing is connected to a flange depending from the lower punch guide.

As an alternative to positioning the bearing assembly at a bottom level of the turret, which is most convenient because many auxiliary components are traditionally supported from below, the bearing assembly may be connected to the upper punch guide or to the die disc. This ensures maximum flexibility.

The at least one auxiliary component is preferably attached to the support means to permit removal from the compression section of the housing with the turret without disconnecting the auxiliary component(s). Removal in connection with the turret provides a fast change-over, and once mounted, the position of the auxiliary components relative to the turret remains fixed at all times. The same turret can be used in different presses without the need of press dependent readjustment; for instance, the position of certain components can even already be defined in the factory. The turret can be completely prepared out of press for next production process, resulting in fast change-over. Even a shift from single layer to multilayer or vice versa can be prepared out of press. If alignment of certain components is needed, this can be done relatively easy because of good access to all parts.

In a preferred embodiment, the at least one auxiliary component comprises a feeder or feeders of the turret. The requirements to the accuracy of the position of the feeder(s) relative to the turret is particularly firm. The enablement of referencing the position in the axial direction, i.e. the vertical position, when the turret is in an upright position, of the auxiliary component relative to the turret is of particular interest for the feeder of the press, as its position has to be well controlled to ensure good operation of the press and minimize powder loss. Up to now, the axial or vertical position of the feeder is always defined by a support connected to the press housing. In that case, the position of the feeder relative to the die table can only be adjusted and optimized if the turret is mounted inside the press housing. Inside the press housing however, the accessibility is limited, especially in the case of a multilayer tablet configuration wherein a larger number of components are arranged around the tablet press.

Other auxiliary components that benefit from easy adjustment and referencing may include a cover.

The cover may be made from a light-weight, preferably transparent material, which ensures a reduced weight rendering the cover easy to handle, and in the preferred further development entails a, good visibility of the compression region.

The cover may be made of one piece of material or assembled from a limited number of pieces, reducing the complexity of the structure and associated risk of production errors, leaks and poor washability. In turn, this makes it possible to reduce the number of seals when compared to the prior art ECM design, thus reducing the accompanying potential risk of leaking toxic products. As the cover may be removed from the compression section together with the turret, the cover may easily be removed when turret is outside of tablet press, increasing the accessibility and facilitating cleaning. The concept of a simple cover is furthermore compatible with arrangements incorporating an exchangeable die disc; once the cover is removed, the upper part of the turret can be lifted up and the die disc can be replaced by another one. Furthermore, the cover may be provided with locking means to ensure tight sealing between the cover and the support means of the bearing assembly.

Preferably, a seal is provided between the turret and the support means.

In a second aspect, a method for providing adjustment of at least one auxiliary component is devised.

Further details and advantages appear from the remaining dependent claims, and from the detailed description of preferred embodiments and examples for carrying out the method set forth below.

BRIEF DESCRIPTION OF THE DRAWINGS

In the following the invention will be described in further detail by means of examples of embodiments and referring to the schematic drawings, in which.

DETAILED DESCRIPTION OF THE INVENTION AND OF PREFERRED EMBODIMENTS

Figure 1:
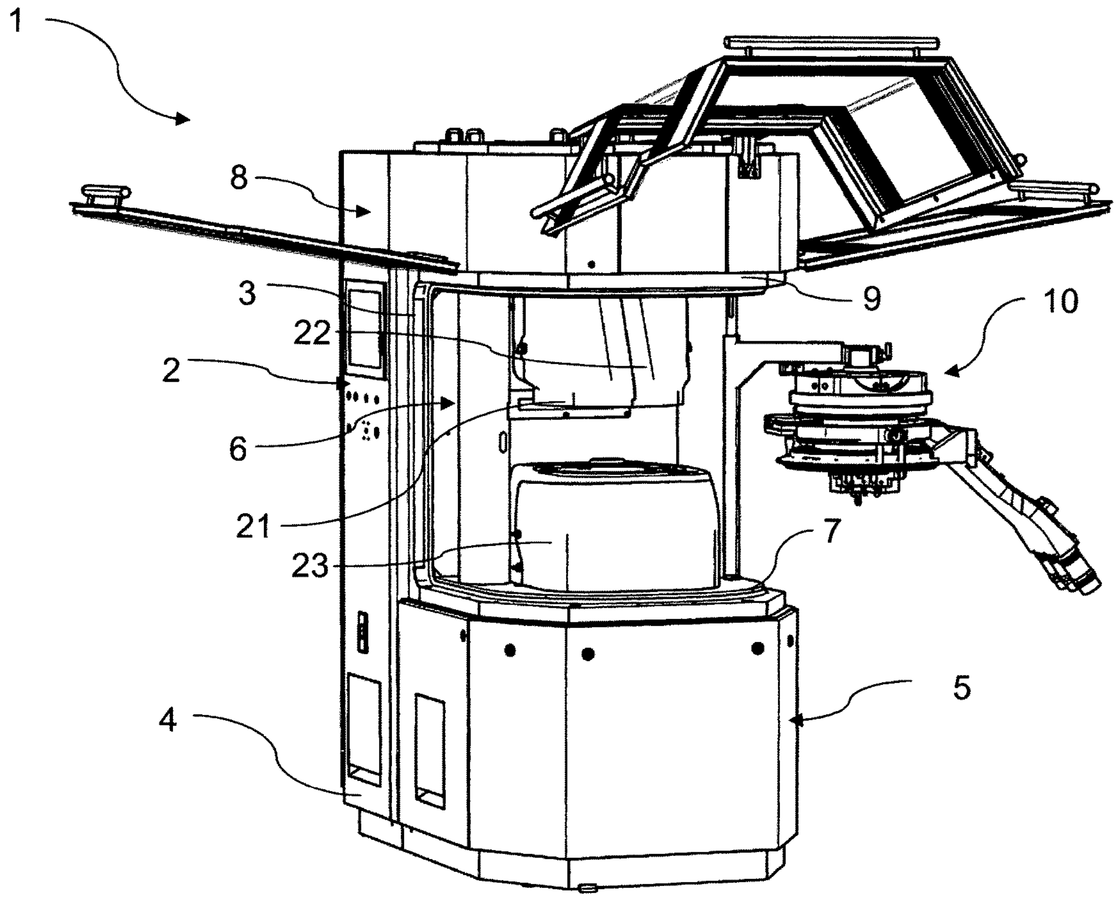
FIG. 1 shows a perspective overview of a rotary tablet press.

Referring first to the schematic overview of FIG. 1 showing a first embodiment of a rotary tablet press generally designated 1, the rotary tablet press 1 has a press housing 2 comprising a frame 3 and an outer lining 4. The press housing 2 is composed of three sections, which are located on top of each other and are separated by means of partition walls. The lower section, designated the drive section 5, is separated from a central section, designated the compression section 6, by a bottom frame 7 of the press, and the compression section 6 is separated from an upper section, designated the accessory section 8, by a top frame 9 of the press. FIG. 1 further shows caps 21, 22 and 23 which are present to prevent excessive contamination of mechanical parts.

It is noted that only parts relevant to the present invention will be described in detail. For detailed information regarding the operation of a rotary tablet press, reference is made to the above-mentioned WO 03/020499 A1 and WO 2009/112886 A1 (Courtoy).

Figure 2:
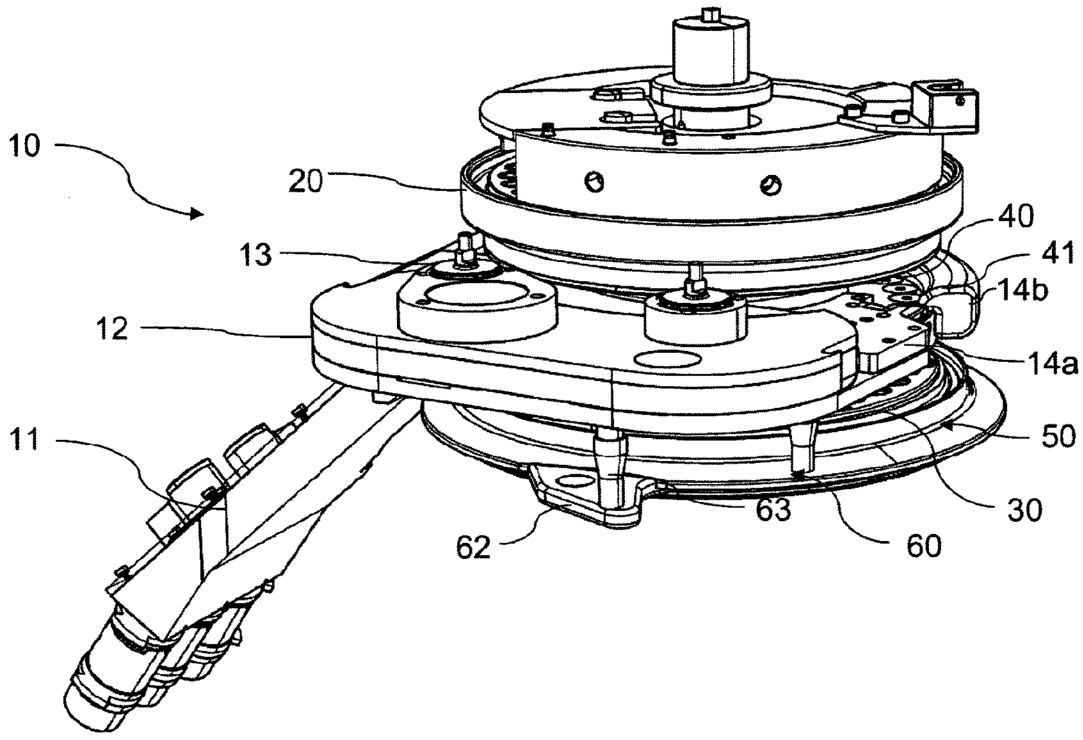
FIG. 2 shows a perspective view, on a larger scale, of details of a rotary tablet press in an embodiment of the invention.
Figure 3:
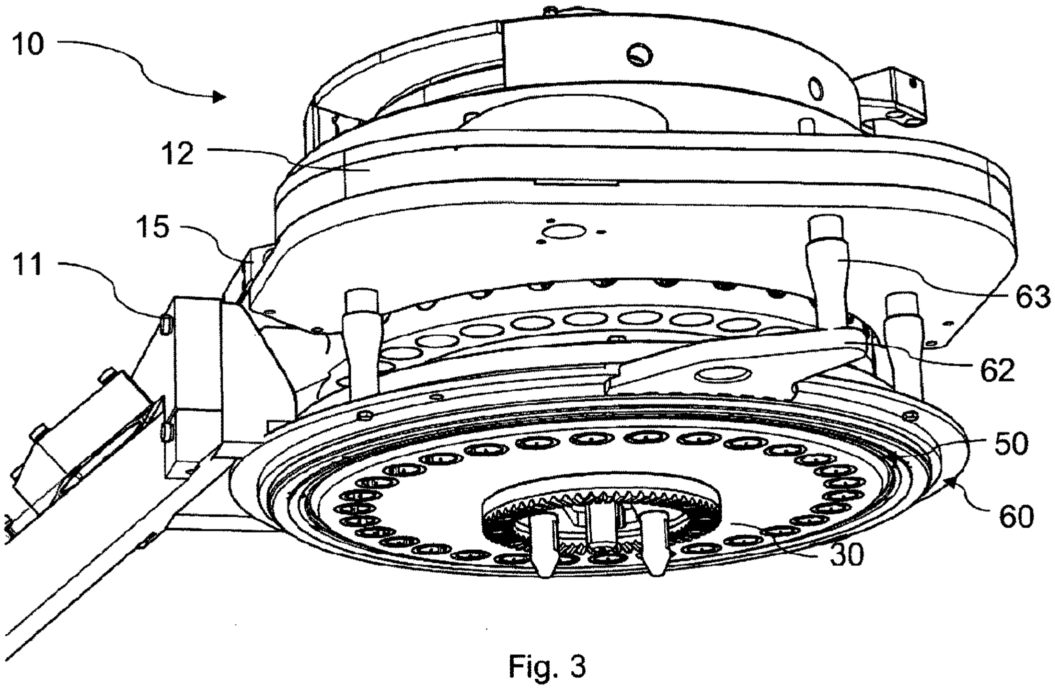
FIG. 3 shows a perspective view of details of the embodiment shown in FIG. 2, seen from below.

In a manner known per se the housing 2 accommodates a turret 10, parts of which are shown in more detail in FIGS. 2 and 3. During operation of the tablet press, the turret 10 is positioned in the compression section 6 of the housing 2, but may be removed from the compression section 6 in order to allow for instance cleaning, change-over of parts, etc. as indicated in FIG. 1.

The turret 10 comprises a top punch guide 20, a bottom punch guide 30, and a die disc 40 between the top punch guide 20 and the bottom punch guide 30. In the embodiment shown, the die disc 40 is substantially plate-shaped and has a number of bores 41 accommodating a corresponding number of dies (not shown) adapted for forming the tablets to the desired shape and size.

Referring also to the schematic view of FIG. 7, the bores 41 are arranged at a predefined radius defining a pitch p of the turret 10. The bores 41 are evenly distributed along a circumferential line near the outer border of the die disc 40, each bore 41 being arranged with its axis parallel to an axial direction $\alpha$ defined by the turret and coinciding with the vertical rotational axis of the turret. The bore 41 may as shown in FIG. 7 receive a die 45. Top and bottom punches 25 and 35 are guided in corresponding guide bores formed in the top punch guide 20 and the bottom punch guide 30, respectively. The punches 25, 35 are accommodated reciprocally in the turret so that a first end of each punch is able to enter a corresponding die, or the bore itself, if no die is present, by displacement of the associated punch in its guide bore, in order to compress material in the die or bore.

A second end of each punch 25, 35 is in a well-known manner cooperating with top and bottom cams, respectively, arranged stationary in relation to the press housing in order to effect axial displacement of the punches by rotation of the turret. The cams only extend along part of the circumference of the turret, and at that circumferential position where the compression of the material in the bore or die is to be performed, top and bottom pre-compression rollers and top and bottom main compression rollers, respectively, take over the displacement of the punches. Alternatively, compression cams may be used instead of compression rollers for pre- and/or main compression.

A number of auxiliary components are provided. A list of such auxiliary components includes, but not exhaustively: a tablet chute 11 protruding from the turret 10 at an angle for conducting away compressed material in the form of tablets from the die bores; a feeder 12 extending in between the die disc 40 and the top punch guide 20, from where it provides the die disc with powder or granules; a powder inlet tube 13 extending in the vertical, i.e. axial direction of the turret, from here powder or granules enter the turret 10 and is fed to the feeder 12. Furthermore, a scraper 14*a* adapted to scrape off excess powder, thereby ensuring that only the desired amount of powder is present in the die disc, an extraction nozzle 14*b* connected to an extraction tube for extracting dust to a suction system and an ejection finger 15 are shown. Further auxiliary components, not referred to specifically in FIGS. 2 and 3, may be present as well, such as a recuperation finger and cams (not shown). Other elements may be present in the tablet press and means for controlling the tablet press according to desired settings may be provided as well.

In the embodiment shown, the single-sided rotary tablet press 1 is adapted for production of single-layer tablets. However, configurations with multiple compression stations, multilayer configurations and configurations for dry-coated tablet production are possible with several feeders, scrapers, compression rollers, ejection stations, core-intake elements etc.

The rotary tablet press 1 comprises a bearing assembly generally designated 50 connected to the turret 10 and providing support to at least one auxiliary component of the rotary tablet press in the axial direction of the turret. As will be described in further detail below, the bearing assembly comprises a bearing 51 and a support means generally designated 60 for the at least one auxiliary component. The bearing 51 is positioned outside the pitch p of the turret in the radial direction r. In the context of the present application, the term "bearing assembly" should encompass a structure comprising the bearing, its housing, elements needed to mount the bearing to the turret and elements needed to enable the connection of auxiliary components to the bearing. It is noted that in the case of multiple concentric rows of punches, the feature "outside the pitch" should be interpreted as meaning outside the pitch of the outermost row of punches.

Figure 4:
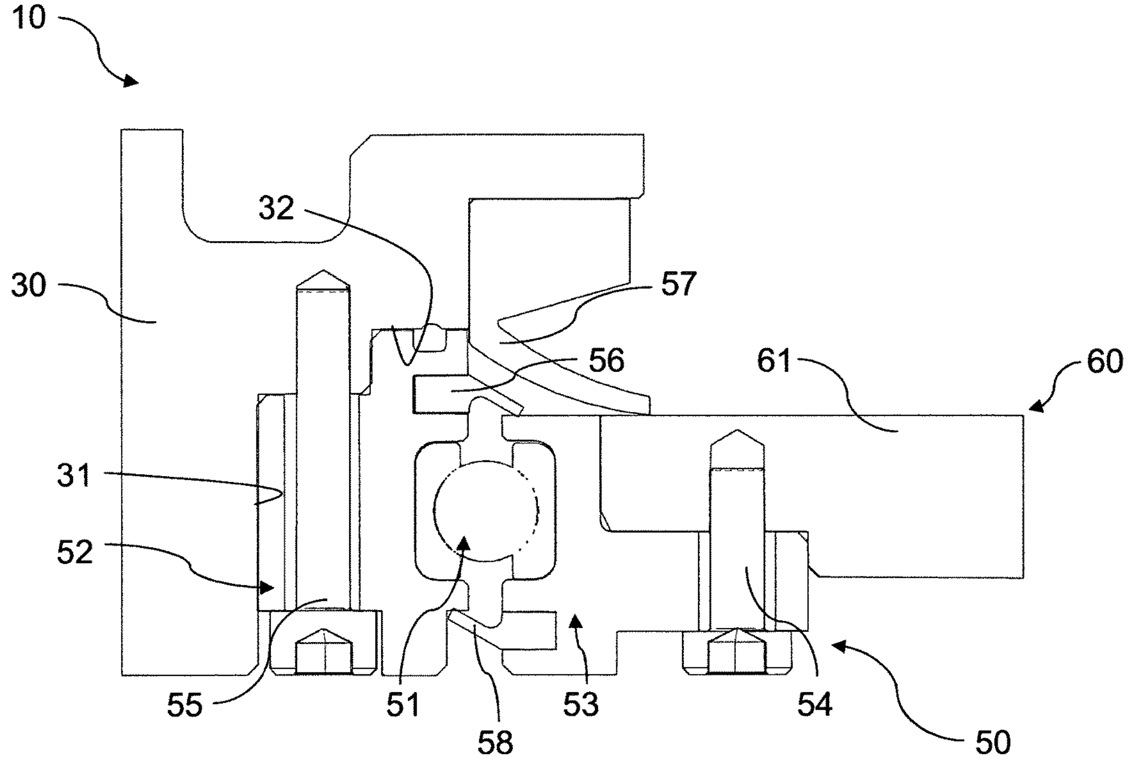
FIG. 4 shows, on a larger scale, a sectional view through parts of the turret, the support plate and a bearing in the embodiment of FIGS. 2 and 3.

As shown in more detail in FIG. 4, the support means 60 in one embodiment comprises an annular support flange 61.

The bearing assembly 50 provides a reference point of one or more of the auxiliary components relative to the turret in the axial direction. Also the position in the radial direction is established. In the embodiment shown in FIGS. 2 and 3, a protruding support section 62 connected to the annular support flange 61 is provided to support the feeder 12. The support section 62 also functions as an anti-rotation element that is interacting with a counterpart (not shown) connected to the press housing.

The auxiliary component or components, for instance the above-mentioned auxiliary components 11-15 are attached to the support means to permit removal from the compression section 6 of the housing 2 with the turret 10 without disconnecting the auxiliary component or components from the turret.

In the embodiment shown in FIG. 4, the bearing assembly 50 comprises a bearing 51, a bearing housing 52, 53 and a support flange 61, the bearing housing including an inner bearing housing part 52 connected to an outwards facing circumferential of the turret, and an outer bearing housing part 53 connected to the support flange 61. The inner bearing housing part 52 is connected to the lower punch guide 30 at a stepped portion 31, 32 constituting the outwards facing circumferential of the turret. The inner bearing housing part 52 is connected to the bottom punch guide 30 by means of fastening means represented by bolt 55, and the outer bearing housing part 53 to the support flange 61 by means of bolt 54. Seals 56, 58 seal off the bearing 51 itself from the surroundings. Finally, a seal 57 is provided between the turret 10 and the support means 60, protecting the bearing assembly against contamination by powder and cleaning fluids.

The bearing 51 may be any type of bearing capable of fulfilling the demands as to load-bearing capacity and accuracy. In the embodiment shown in FIG. 4, the bearing 51 is shown as a general representation of a four point contact ball bearing, preferably a pre-loaded bearing. Other types of conceivable bearings include roller bearings (taper or cylindrical), cross roller bearings, needle bearings, combined bearings and plain bearings.

Figure 5:
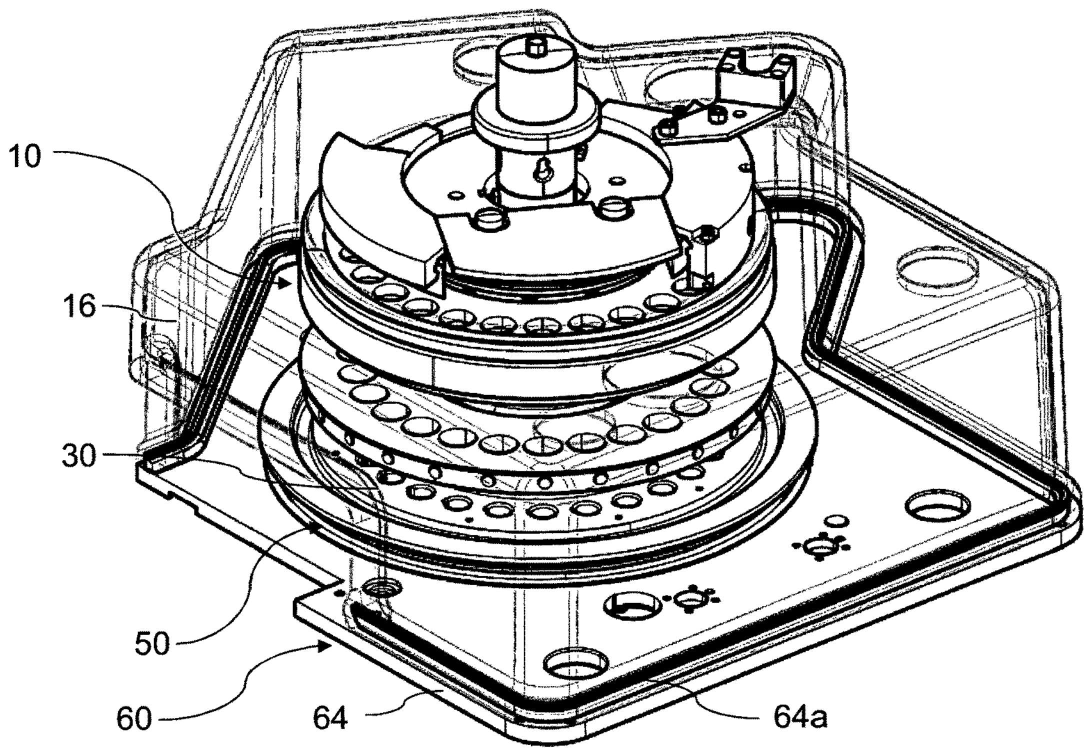
FIGS. 5 and 6 show perspective views of details of a further embodiment of a rotary tablet press according to the invention.
Figure 6:
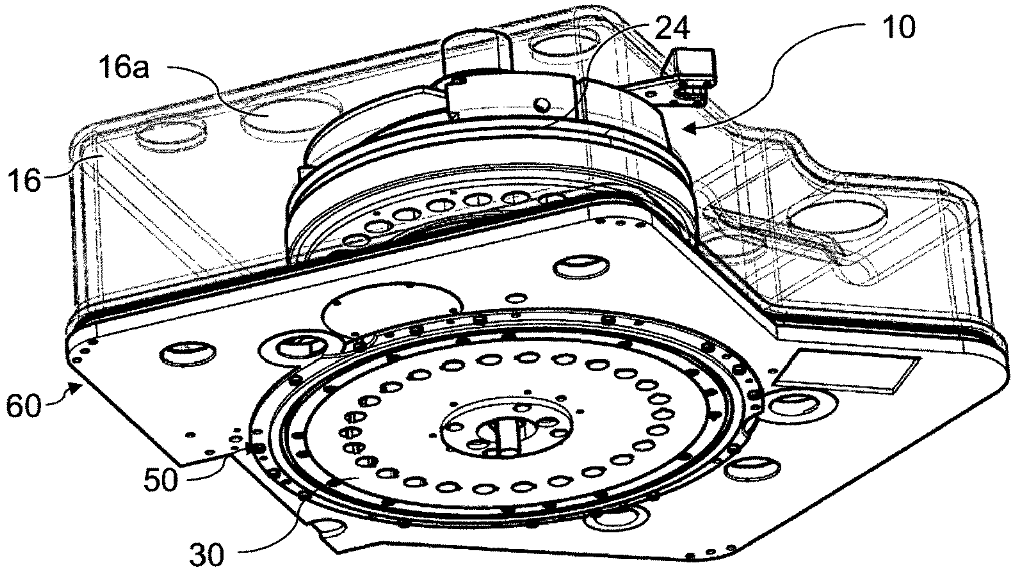

Referring now to FIGS. 5 and 6, a further embodiment of the rotary tablet press will be described. In this description, only differences relative to the embodiment shown in FIGS. 2 and 3 will be described in detail, and elements having the same or analogous function carry the same reference numerals, even though slight deviations from the first embodiment may occur.

In the embodiment shown, a cover 16 is attached to a support plate 64 forming part of the support means. The cover 16 is made from a transparent material as indicated schematically in FIG. 6, and is preferentially made of a light-weight material. However, cover can also be made of opaque material and have one or several transparent parts/windows. The cover 16 is placed in connection with the support plate, sealing against the support plate by means of sealing 64*a*. Although not shown, locking means may be provided to ensure tight sealing between the cover and the support plate. In the embodiment shown, the cover 16 also extends across the top of the turret 10 and comprises one or more aperture(s) 16*a* for receiving tubing to the interior of the cover, or other elements like shaft transmission to drive the feeder wheels, sensor cables, top cams, a non-return valve communicating with the surroundings and arranged to prevent outflow from the compression chamber to the surroundings of the tablet press. A sealing can be provided to seal the gap between the cover and these elements. In case of the cover 16, it is most convenient to provide a plate-like support element as the support plate 60, whereon the cover 16 is placed. This is not necessarily an additional plate, but can be an extended support flange or even the bearing housing elongated in the radial direction. Eventually, in the embodiment shown, a sealing 24 seals between the top punch guide of the turret 10 and the cover 16.

The cover 16 can be removed from the turret and support plate as an integral piece, or as a limited number of separate cover parts. It is also an option to partially or even completely removing the cover when the turret is still inside the tablet press.

Figure 7A:
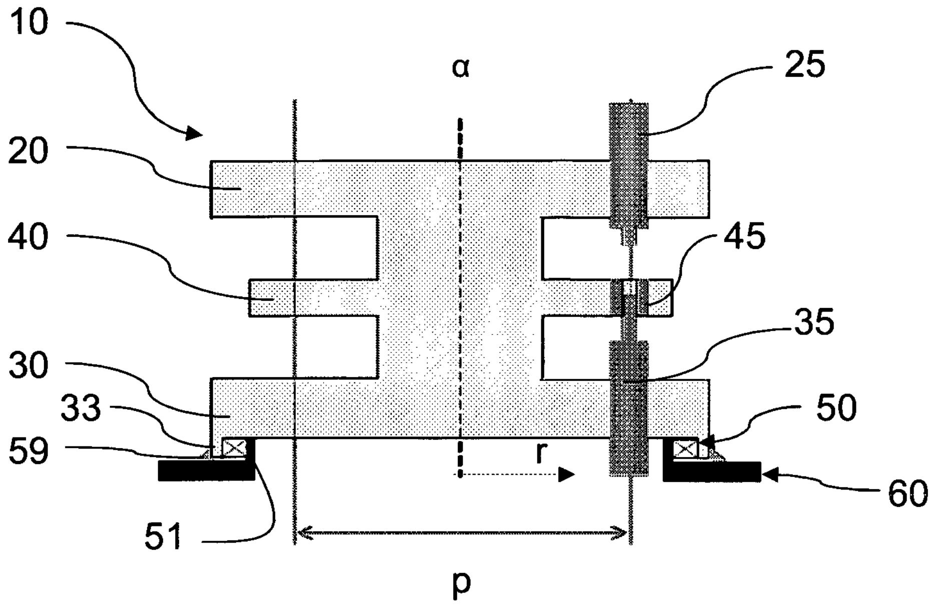
FIGS. 7*a* and 7*b* show schematic axial sections of further embodiments of the rotary tablet press.

In the alternative embodiment shown in FIG. 7*a*, the bearing assembly 50, 60 comprises a bearing 51 connected to an inwards facing circumferential of the turret, namely to a flange 33 depending from the lower punch guide 30.

Figure 7B:
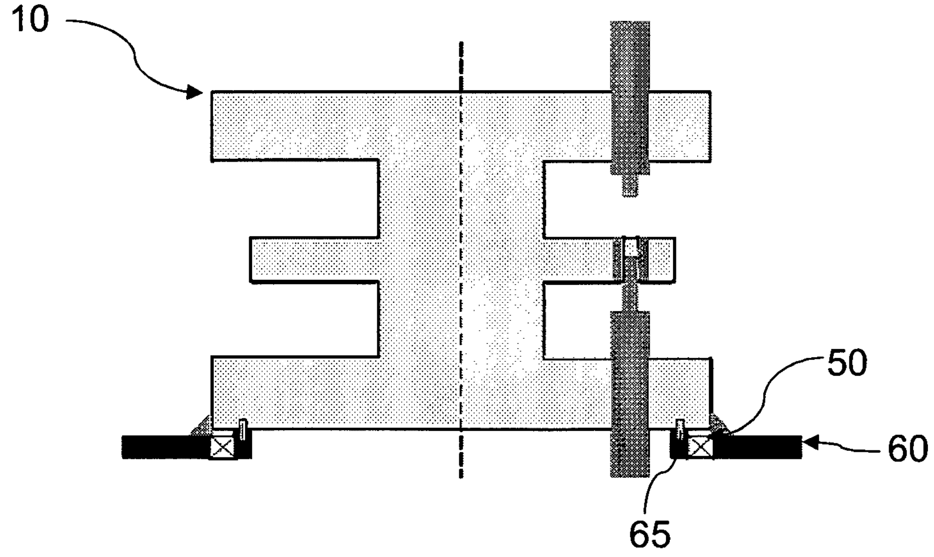

In the further alternative embodiment of FIG. 7*b*, the bearing 51 is attached to the bottom plane of the bottom punch guide 30 and centered by means of dowel pins 65. Other details of this embodiment correspond in substance to those of the embodiment shown in FIG. 7*a*.

Figure 8:
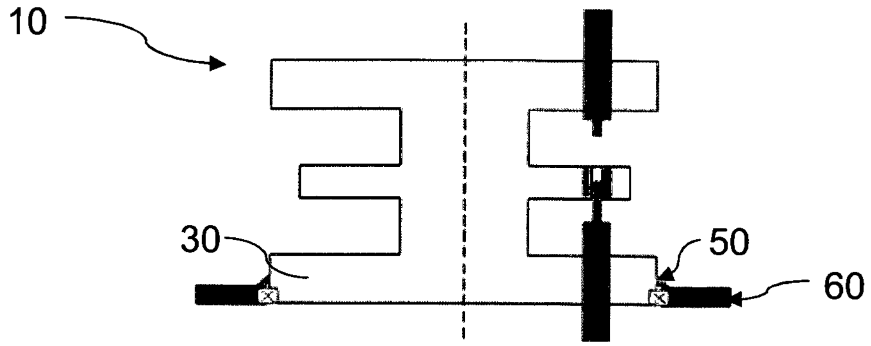
FIGS. 8 to 10 show schematic axial sections of still further embodiments of the rotary tablet press including details such as the turret, with the support plate positioned at the bottom, die disk and top of the turret, respectively.
Figure 9:
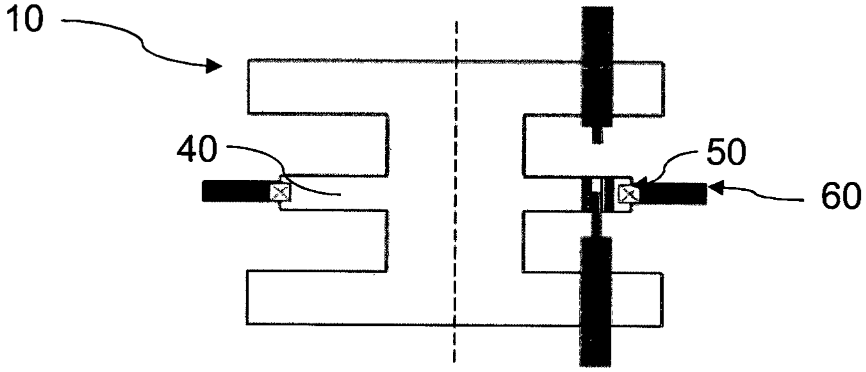
Figure 10:
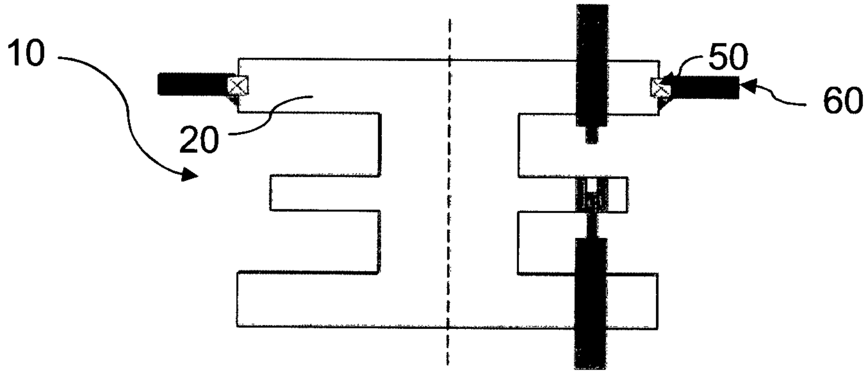

In FIGS. 8 to 10, three different positions of the bearing assembly relative to the turret are shown.

FIG. 8 corresponds in substance to the embodiments of FIGS. 2 to 3, 4, and 5 to 6, as the bearing assembly 50, 60 is connected to the bottom punch guide 30.

In the embodiment of FIG. 9, the bearing assembly 50, 60 is connected to the die disc 40.

Finally, in the embodiment of FIG. 10, the bearing assembly 50, 60 is connected to the upper punch guide 20.

The invention is not limited to the embodiments shown and described in the above. Several combinations and modifications may be carried out without departing from the scope of the appended claims.

The invention claimed is:

1. A rotary tablet press comprising:
a housing including a compression section,
a turret including a die disc, a top punch guide, a bottom punch guide, and a plurality of punches, said turret defining an axial direction ($\alpha$) and a radial direction (r), the plurality of punches being arranged at a predefined radius defining a pitch (p) of the turret, said turret being positioned in the compression section in a position of use of the rotary tablet press, and
a number of auxiliary components,
wherein the rotary tablet press comprises a bearing assembly connected to the turret and providing support to at least one of the number of auxiliary components of the rotary tablet press, and wherein the bearing assembly comprises a bearing and a support means for the at least one of the number of auxiliary components, and wherein the bearing is positioned outside the pitch (p) of the turret in the radial direction (r), and wherein a reference point relative to the turret is provided.

2. A rotary tablet press according to claim 1, wherein the bearing assembly provides support in the axial direction ($\alpha$) and the radial direction (r) of the turret.

3. A rotary tablet press according to claim 1, wherein the bearing comprises a ball bearing, wherein the ball bearing is one or more of a four point contact ball bearing or a pre-loaded bearing.

4. A rotary tablet press according to claim 1, further comprising an anti-rotation element that prevents the support means from rotating during use.

5. A rotary tablet press according to claim 1, wherein the bearing assembly further comprises a bearing housing and a support flange, the bearing housing comprising an inner bearing housing part connected to an outwards facing circumferential of said turret, and the bearing housing comprising an outer bearing housing part connected to the support flange.

6. A rotary tablet press according to claim 5, wherein the inner bearing housing part is connected to the bottom punch guide at a stepped portion that comprises said outwards facing circumferential of the turret.

7. A rotary tablet press according to claim 1, wherein the bearing is connected to an inwards facing circumferential of said turret.

8. A rotary tablet press according to claim 7, wherein the bearing is connected to a flange depending from the bottom punch guide.

9. A rotary tablet press according to claim 1, wherein the bearing assembly is connected to the top punch guide.

10. A rotary tablet press according to claim 1, wherein the bearing assembly is connected to the die disc.

11. A rotary tablet press according to claim 1, wherein said at least one of the number of auxiliary components is attached to the support means to permit removal from the compression section of the housing with the turret without disconnecting the number of auxiliary components.

12. A rotary tablet press according to claim 11, wherein the at least one of the number of auxiliary components comprises one or more feeders of the turret.

13. A rotary tablet press according to claim 1, wherein the at least one of the number of auxiliary components comprises a cover.

14. A rotary tablet press according to claim 13, wherein the cover is made from one or more of a light-weight or transparent material.

15. A rotary tablet press according to claim 13, wherein the cover is made from one piece or a limited number of pieces.

16. A rotary tablet press according to any claim 13, wherein the cover comprises a locking means.

17. A rotary tablet press according to claim 1, further comprising a seal between the turret and the support means.

18. A method for providing adjustment of at least one auxiliary component of a rotary tablet press, the method comprising:

providing the rotary tablet press with a housing including a compression section, and a rotary turret including a die disc, a top punch guide, and a bottom punch guide, said rotary turret defining an axial direction and a radial direction, providing said rotary turret in the compression section in a position of use of the rotary tablet press, providing a bearing assembly, connecting the bearing assembly to the rotary turret, connecting at least one auxiliary component to said bearing assembly, wherein the bearing assembly provides a reference point for adjusting the at least one auxiliary component with reference to the rotary turret.

19. The method of claim 18, further comprising supporting the at least one auxiliary component in the axial direction and the radial direction.

20. The method of claim 18, wherein said at least one auxiliary component is removed from the compression section of the housing with the rotary turret without disconnecting the at least one auxiliary component(s) from the rotary turret.

* * * * *